United States Patent
Hashimoto et al.

(10) Patent No.: US 9,670,799 B2
(45) Date of Patent: Jun. 6, 2017

(54) POWER GENERATION APPARATUS INCLUDING PREDETERMINED SLIP-BASED TIME DELAY CONTROL FOR GRID CONNECTION

(71) Applicant: Kabushiki Kaisha Kobe Seiko Sho (Kobe Steel, Ltd.), Kobe-shi (JP)

(72) Inventors: Kouichirou Hashimoto, Takasago (JP); Shigeto Adachi, Takasago (JP); Masayoshi Matsumura, Takasago (JP); Haruyuki Matsuda, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/100,461

(22) Filed: Dec. 9, 2013

(65) Prior Publication Data

US 2014/0252767 A1    Sep. 11, 2014

(30) Foreign Application Priority Data

Mar. 5, 2013    (JP) ................................. 2013-042760

(51) Int. Cl.
    *F01K 13/02*    (2006.01)
    *H02P 9/10*    (2006.01)
    (Continued)

(52) U.S. Cl.
    CPC ............... *F01K 13/02* (2013.01); *H02P 9/04* (2013.01); *H02P 9/08* (2013.01); *H02P 9/102* (2013.01);
    (Continued)

(58) Field of Classification Search
    CPC .... F01K 13/02; F03B 13/10; F05B 2220/702; F05B 2220/70644; H02P 9/04; H02P 9/08; H02P 9/102
    See application file for complete search history.

(56) References Cited

U.S. PATENT DOCUMENTS 4,201,924 A * 5/1980 Uram ........................ 290/40 R
4,492,874 A * 1/1985 Near ........................ 290/40 B
(Continued)

FOREIGN PATENT DOCUMENTS

CN    1950591 A    4/2007
JP    6-165393    6/1994
(Continued)

OTHER PUBLICATIONS

Extended European Search Report issued Oct. 6, 2014 in Patent Application No. 13195989.2.

*Primary Examiner* — Tulsidas C Patel
*Assistant Examiner* — S. Mikailoff
(74) *Attorney, Agent, or Firm* — Oblon, McClelland, Maier & Neustadt, L.L.P.

(57) ABSTRACT

A power generation apparatus according to the present invention includes: an induction generator; a switch that opens or closes an electrical connection path connecting the induction generator to an electrical path in which an alternating current of a predetermined frequency flows; a control unit that controls the opening and closing state of the switch; and an expander that rotationally drives the induction generator by a working medium supplied thereto. In order to suppress a starting current generated when starting the induction generator while suppressing an increase in cost, the control unit closes the switch after the working medium is supplied to the expander so that the expander starts to rotationally drive the induction generator.

5 Claims, 5 Drawing Sheets

(51) Int. Cl.
*H02P 9/04* (2006.01)
*H02P 9/08* (2006.01)
*F03B 13/10* (2006.01)

(52) U.S. Cl.
CPC ......... *F03B 13/10* (2013.01); *F05B 2220/702* (2013.01); *F05B 2220/70644* (2013.01)

(56) References Cited

U.S. PATENT DOCUMENTS

| | | | | |
|---|---|---|---|---|
| 4,616,166 A * | 10/1986 | Cooper | ................... | B60L 11/06 290/31 |
| 2004/0008010 A1 * | 1/2004 | Ebrahim | ................... | H02P 9/04 322/44 |
| 2005/0247059 A1 * | 11/2005 | Cogswell et al. | ............. | 60/645 |
| 2006/0066113 A1 * | 3/2006 | Ebrahim | ................... | H02P 9/04 290/52 |
| 2006/0242961 A1 * | 11/2006 | Sato | ........................ | F01K 13/02 60/645 |
| 2009/0071156 A1 * | 3/2009 | Nishikawa | .............. | F01K 13/02 60/660 |
| 2010/0038907 A1 * | 2/2010 | Hunt | ................... | E21B 41/0085 290/7 |
| 2010/0205959 A1 * | 8/2010 | Kasuya et al. | ................. | 60/618 |
| 2011/0313584 A1 * | 12/2011 | Carson | ..................... | H02P 9/04 700/295 |
| 2012/0013125 A1 * | 1/2012 | Myers et al. | ................... | 290/52 |
| 2012/0312021 A1 * | 12/2012 | Tsuboi et al. | ................... | 60/667 |
| 2013/0000304 A1 * | 1/2013 | Tsuboi et al. | ................... | 60/665 |
| 2014/0039708 A1 * | 2/2014 | Curtis et al. | ................... | 700/288 |
| 2014/0075941 A1 * | 3/2014 | Adachi | .................. | F01K 13/02 60/646 |
| 2014/0298812 A1 * | 10/2014 | Bannister | ................ | F01C 20/06 60/645 |

FOREIGN PATENT DOCUMENTS

| | | | |
|---|---|---|---|
| JP | 2002-155846 | 5/2002 | |
| JP | 2007-28697 | 2/2007 | |
| JP | 2007-536457 | 12/2007 | |
| WO | WO 2005/108749 A1 | 11/2005 | |
| WO | WO 2013041857 A2 * | 3/2013 | ............. F01C 20/06 |

* cited by examiner

POWER GENERATION APPARATUS INCLUDING PREDETERMINED SLIP-BASED TIME DELAY CONTROL FOR GRID CONNECTION

BACKGROUND OF THE INVENTION

Field of the Invention

The present invention relates to a power generation apparatus that includes an induction generator and a power generation method that uses an induction generator.

Description of the Related Art

Hitherto, various power generation apparatuses using a synchronous generator are known. For example, Japanese Patent Application Laid-Open 2002-155846 discloses a power generation apparatus that includes a water wheel provided in a waterwork piping system, a synchronous generator that is rotationally driven by the water wheel, and a power converter that converts the output of the synchronous generator and supplies the converted output to a system. The synchronous generator that is used in the power generation apparatus is large and expensive due to its complex structure on the ground that a voltage adjuster for causing an excitation current to flow into a secondary winding wire is needed.

Therefore, for example, as disclosed in Japanese Patent Application Laid-Open 2007-28697, there is proposed a power generation apparatus that has a simple structure and low cost. The power generation apparatus includes a water wheel, an induction generator that is rotationally driven by the water wheel, and an inverter that is connected to the induction generator. The induction generator may generate power by obtaining an excitation current from a system power supply or the like. Further, the inverter adjusts a frequency of an alternating current (an excitation current) supplied from the system power supply or the like to the induction generator.

In such a power generation apparatus, when the power generation apparatus is started, that is, the water wheel starts to rotate, the frequency of the excitation current supplied to the induction generator is gradually increased by the inverter in accordance with an increase in the rotation speed of the induction generator. Then, when the rotation speed of the rotor becomes larger than the synchronization speed (the rotation speed of the rotation magnetic field), power (current) is supplied from the induction generator to the system connected to the induction generator.

SUMMARY OF THE INVENTION

When the current flowing in the system directly flows into the induction generator as the excitation current used for the start-up operation, the induction generator becomes parallel to the system in a no-voltage state. Accordingly, an overcurrent (a starting current and a rush current) that becomes larger than the rated current (so that the overcurrent becomes, for example, five to eight times the rated current) instantly flows from the system to the induction generator. For this reason, the power generation apparatus that uses the above-described induction generator is provided with the inverter, and the inverter adjusts the frequency of the current (the excitation current) flowing from the system so that the frequency gradually increases with an increase in the rotation speed of the induction generator when starting the power generation apparatus. In this way, since the power generation apparatus with the induction generator is provided with units (the inverter and the like) for suppressing the starting current, the cost increases.

Therefore, the present invention is made in view of the above-described problems, and an object of the present invention is to provide a power generation apparatus capable of suppressing a starting current generated when starting an induction generator while suppressing an increase in cost and also provide a power generation method thereof.

In order to solve the above-described problems, according to an aspect of the present invention, there is provided a power generation apparatus including: an induction generator; a switch that opens or closes an electrical connection path connecting the induction generator to an electrical path in which an alternating current of a predetermined frequency flows; a control unit that controls the opening and closing state of the switch; and an expander that rotationally drives the induction generator by a working medium supplied thereto. Then, the control unit performs a control so that the switch is closed after the expander starts to rotationally drive the induction generator by the working medium supplied thereto.

Further, according to another aspect of the present invention, there is provided a power generation method that uses an induction generator connected to an expander, the power generation method including: supplying a working medium to an expander; and opening or closing an electrical connection path that connects an induction generator to an electrical path in which an alternating current of a predetermined frequency flows. Then, in the opening or closing of the electrical path, the electrical connection path is closed after the working medium is supplied to the expander so that the expander rotationally drives the induction generator in the supplying of the working medium.

According to such a configuration, a difference (that is, a slip) between the rotation speed (the rotation frequency) of the induction generator and the frequency of the alternating current flowing from the electrical path into the induction generator at the time point in which the induction generator is connected to the electrical path so that the excitation current is supplied to the induction generator may be set to be smaller than that of the case where the induction generator is connected to the electrical path while the expander does not rotationally drive the induction generator. Accordingly, even when a unit such as an inverter for suppressing the starting current is not provided, it is possible to suppress the starting current (the overcurrent caused by the difference between the rotation frequency of the induction generator and the frequency of the alternating current flowing from the electrical path) flowing from the electrical path into the induction generator at the time point in which the induction generator is connected to the electrical path during the start-up operation of the power generation apparatus.

The power generation apparatus according to the aspect of the present invention may further include a rotation speed detector that detects a rotation speed of the induction generator, and the control unit may perform a control so that the switch is closed based on the rotation speed of the rotation speed detector.

According to such a configuration, since the induction generator is connected to the electrical path based on the detected rotation speed of the induction generator, the induction generator is reliably rotationally driven by the expander (that is, the rotor of the induction generator is reliably rotated) at the time point in which the induction generator is connected to the electrical path. For this reason, it is possible to reliably decrease the difference between the rotation frequency and the frequency of the alternating current compared to the case where the induction generator is connected to the electrical path while the induction generator is stopped. As a result, it is possible to reliably suppress the starting current that flows from the electrical path into the induction generator when the induction generator is connected to the electrical path.

The power generation apparatus may be a so-called binary power generation apparatus. That is, the power generation apparatus may further include: a circulation flow passage in which the working medium flows and the expander is disposed; an evaporator that is disposed at the upstream side of the expander in the circulation flow passage and evaporates the working medium by a heating medium supplied from the outside; a condenser that is disposed at the downstream side of the expander in the circulation flow passage and condenses the working medium discharged from the expander by a cooling medium supplied from the outside; and a pump that is disposed between the condenser and the evaporator in the circulation flow passage and supplies the working medium condensed by the condenser to the evaporator.

Further, in the power generation apparatus, the control unit may control the pump so that the amount of the working medium supplied to the evaporator gradually increases until the switch is closed after the expander starts to rotationally drive the induction generator.

According to such a configuration, since the amount of the working medium supplied to the evaporator gradually increases, it is possible to prevent a problem in which the rotation speed of the induction generator abruptly increases due to an abrupt increase in the amount of the working medium (the evaporated working medium) supplied to the expander.

As described above, according to the present invention, it is possible to provide the power generation apparatus capable of suppressing the starting current generated when starting the induction generator while suppressing an increase in cost and also provide the power generation method thereof.

DESCRIPTION OF THE PREFERRED EMBODIMENTS

Figure 1:
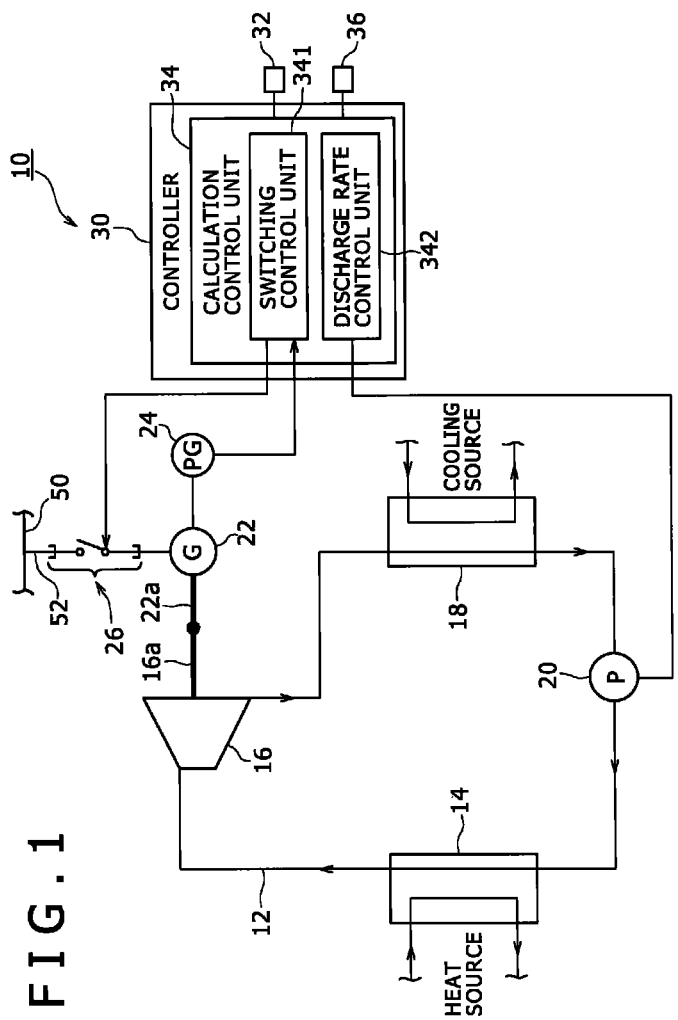
FIG. 1 is a schematic configuration diagram illustrating a power generation apparatus according to an embodiment.
Figure 2:
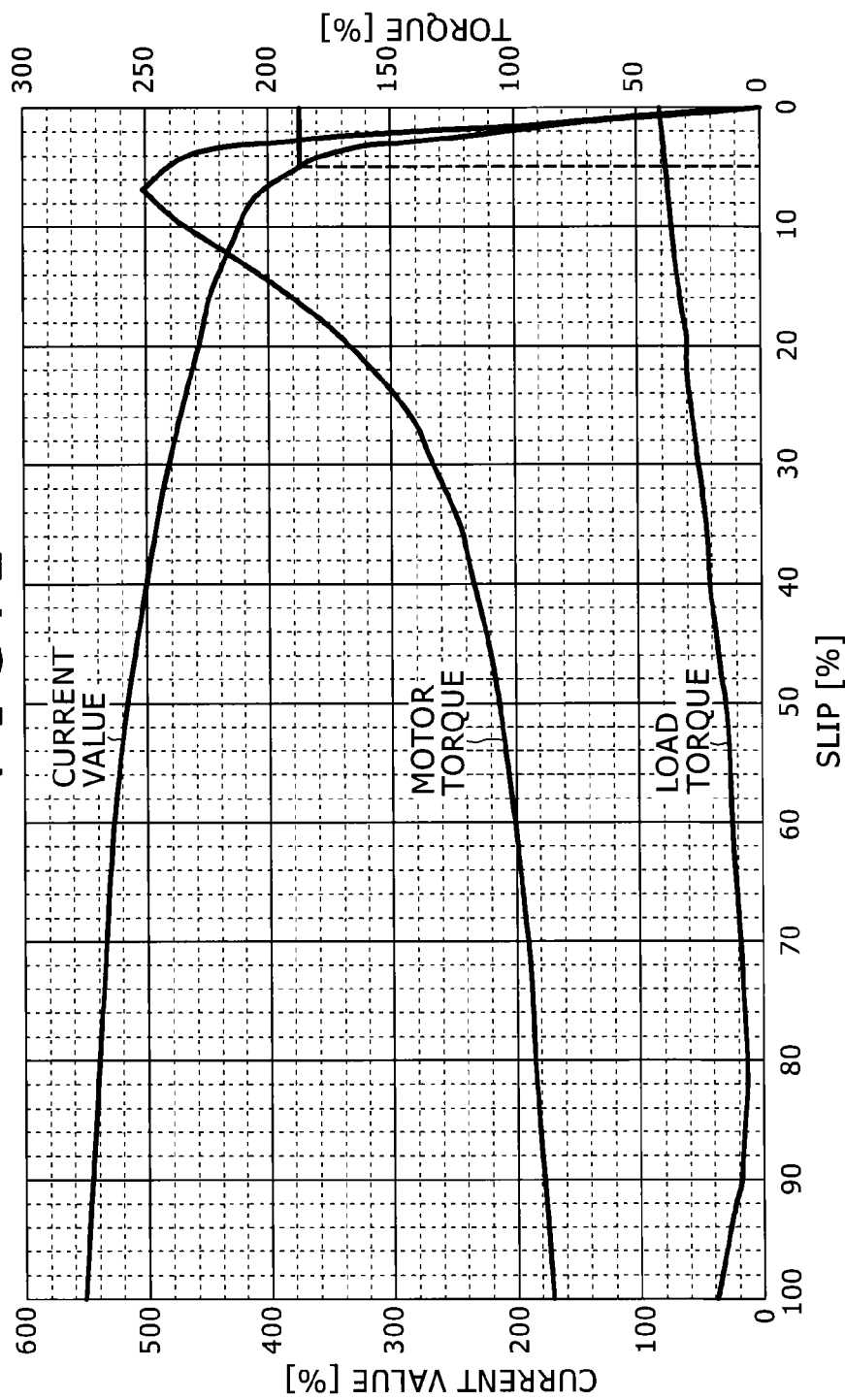
FIG. 2 is a diagram illustrating a relation between a magnitude of a slip of an induction generator and a magnitude of a starting current flowing into the induction generator.
Figure 3:
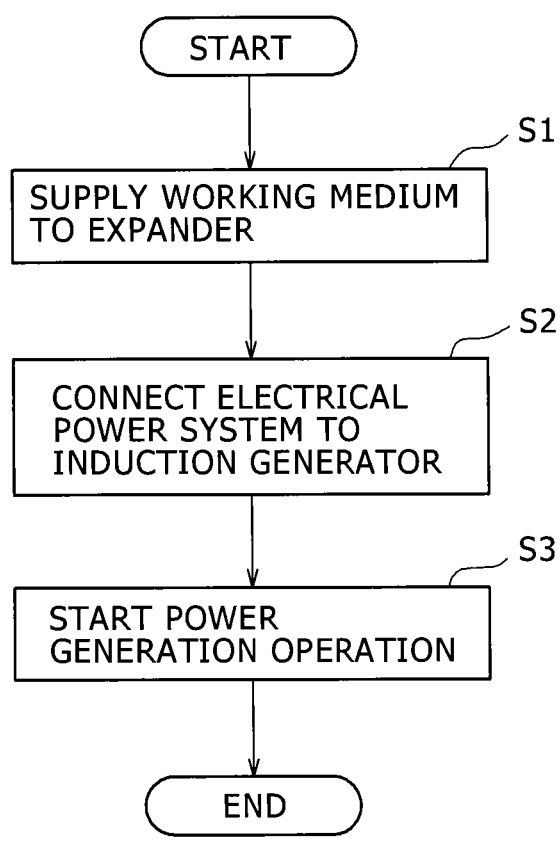
FIG. 3 is a flowchart illustrating a power generation operation of the power generation apparatus.

Hereinafter, an embodiment of the present invention will be described by referring to FIGS. 1 and 2. FIG. 1 is a schematic configuration diagram illustrating a power generation apparatus according to the embodiment, and FIG. 2 is a diagram illustrating a relation between a magnitude of a slip of an induction generator and a magnitude of a starting current flowing into the induction generator. FIG. 3 is a flowchart illustrating a power generation operation of the power generation apparatus.

As illustrated in FIG. 1, the power generation apparatus according to the embodiment is a so-called binary power generation apparatus (organic rankine cycle type power generation apparatus), and generates power by the use of an induction generator.

A power generation apparatus 10 includes a circulation flow passage 12 through which a working medium (working fluid) circulates, an evaporator 14, an expander 16, a condenser 18, and a circulation pump 20. The evaporator 14, the expander 16, the condenser 18, and the circulation pump 20 are disposed in the circulation flow passage 12. Further, the power generation apparatus 10 includes an induction generator 22 that is connected to the expander 16, a rotation speed detector 24 that detects the rotation speed (the rotation frequency) of the induction generator 22, a switch 26 that is disposed in an electrical connection path 52 for connecting the induction generator 22 to an electric power system (electrical path) 50, and a controller 30 that controls the power generation apparatus 10.

Furthermore, in the power generation apparatus 10 of the embodiment, for example, a low-boiling-point organic medium such as R245fa having a boiling point lower than that of water is used as the working medium, but the present invention is not limited thereto. Further, an alternating current of a commercial frequency (50 Hz or 60 Hz) flows to the electric power system 50 to which the power generation apparatus 10 is connected.

The evaporator 14 heats and evaporates (gasifies) the working medium by causing a heat exchange between a heating medium (for example, vapor sampled from a winze, vapor produced by a boiler, hot water, or the like) supplied from a heat source outside the apparatus and the working medium flowing in the circulation flow passage 12.

The expander 16 is disposed at the downstream side of the evaporator 14 in the circulation flow passage 12. The expander 16 is driven by the working medium that is evaporated (vaporized) by the evaporator 14, and the rotation power is output to the outside. The expander 16 of the embodiment is, for example, a screw-type expander. The induction generator 22 (specifically, a rotation shaft 22a of the induction generator 22) is connected (coupled) to a rotational drive shaft 16a of the expander 16, and the induction generator 22 generates power by the rotation of the rotational drive shaft 16a. Furthermore, the expander 16 is not limited to the screw type, and may be a different expander of a turbine type or a scroll type.

The condenser 18 is disposed at the downstream side of the expander 16 in the circulation flow passage 12. The condenser 18 cools and condenses the working medium by causing a heat exchange between a cooling medium (for example, cooling water supplied from a river or a cooling tower) supplied from a cooling source outside the apparatus and the working medium.

The circulation pump 20 is disposed at the downstream side of the condenser 18 and the upstream side of the evaporator 14 in the circulation flow passage 12. The circulation pump 20 pressurizes the working medium that becomes a liquid by the condensation of the condenser 18 to a predetermined pressure and delivers the result to the evaporator 14. The circulation pump 20 is connected to the controller 30, and the rotation speed is adjusted by a rotation control signal output from the controller 30, so that the working medium discharge rate is adjusted.

The induction generator 22 is connected to the electric power system 50 connected to a commercial power supply (that is, AC power of a commercial frequency flows in the electric power system) via an electrical connection path 52, generates an alternating current having the same frequency as that of the power flowing in the electric power system 50, and supplies the power to the commercial power supply. The induction generator 22 includes a stator (not illustrated) having a primary winding wire, a rotor (not illustrated) having a secondary winding wire, and a rotation shaft 22a capable of transmitting the external rotation power to the rotor. In the induction generator 22 of the embodiment, the primary winding wire of the stator is connected to the electric power system 50 via the electrical connection path 52, and the rotation shaft 22a is connected (coupled) to the rotational drive shaft 16a of the expander 16. In the induction generator 22, the rotor rotates at a rotation speed faster than a synchronization speed while the alternating current flowing in the electric power system 50 is supplied to the primary winding wire of the stator as the excitation current. In other words, the rotor rotates at a rotation frequency larger than the frequency of the excitation current (in the embodiment, the alternating current flowing in the electric power system 50) so as to generate power, and the generated power is output to the electric power system 50.

The rotation speed detector 24 detects the rotation speed (or the rotation frequency) of the rotation shaft 22a (or the rotor) of the induction generator 22, and outputs a rotation detection signal in response to the detected rotation speed. The rotation speed detector 24 of the embodiment is connected to the controller 30, and outputs the rotation detection signal to the controller 30. The rotation speed detector 24 may be a contact-type detector that detects the rotation speed of the rotation shaft 22a while partially contacting (connected to) the rotation shaft 22a or the like of the induction generator 22 or may be a non-contact-type detector that detects the rotation speed of the rotation shaft 22a while not contacting the rotation shaft 22a or the like.

The switch 26 is provided in the electrical connection path 52 that connects the induction generator 22 to the electric power system 50. The switch 26 opens or closes the electrical connection path 52 based on the switching signal from the controller 30. The switch 26 is opened when the induction generator 22 is stopped. The switch 26 of the embodiment is, for example, an electromagnetic switch, but is not limited thereto.

The controller 30 includes an input unit 32 that is configured as, for example, a keyboard or a mouse, a calculation control unit 34 that outputs a calculation result or a signal for controlling the respective units of the power generation apparatus 10 based on the input signal from the input unit 32, and an output unit 36 that is configured as a display device or a printing apparatus such as a printer and performs a predetermined display in response to the output from the calculation control unit 34.

The calculation control unit 34 controls the respective units of the power generation apparatus 10 in response to the functions of the respective units so as to generate power. The calculation control unit 34 includes, for example, a CPU (Central Processing Unit), a non-volatile storage element such as a ROM (Read Only Memory) or an EEPROM (Electrically Erasable Programmable Read Only Memory) that stores various programs executed by the CPU or data necessary for the execution, a volatile storage element such as a RAM (Random Access Memory) that becomes a so-called working memory of the CPU, and a microcomputer that includes a peripheral circuit and the like.

The calculation control unit 34 with such a configuration functionally includes a switching control unit (control unit) 341 and a discharge rate control unit 342 so that the calculation control unit 34 executes the program.

The switching control unit 341 outputs a switching signal so as to control the switching operation of the switch 26, so that the electrical connection path 52 is opened or closed. For example, when the switching control unit 341 closes the switch 26, the power (the alternating current of the commercial frequency) flowing in the electric power system 50 is supplied to the induction generator 22 as the excitation current, so that the induction generator 22 may generate power. Meanwhile, when the switching control unit 341 opens the switch 26, the excitation current is not supplied to the induction generator 22, so that the power generation operation of the induction generator 22 is stopped and the supply of the power from the induction generator 22 to the electric power system 50 is stopped.

Further, the switching control unit 341 performs a control so that the switch 26 is closed after the expander 16 rotationally drives the induction generator 22 when starting (activating) the power generation apparatus 10. Specifically, this operation is as below.

When the power generation apparatus 10 is started (activated), the gasified working medium starts to be supplied to the expander 16 via the circulation flow passage 12. Then, the flow amount of the working medium supplied to the expander 16 gradually increases, so that the rotation speed (the rotation frequency) of the induction generator 22 rotationally driven by the expander 16 also gradually increases. At this time, the switching control unit 341 closes the switch 26 at the time point in which the rotation speed of the rotation shaft 22a (or the rotor) detected by the rotation speed detector 24 exceeds a setting value. The setting value of the embodiment is, for example, 1000 rpm. When the switch 26 is closed, the induction generator 22 and the electric power system 50 are electrically connected to each other via the electrical connection path 52, and the alternating current flowing in the electric power system 50 is supplied to the induction generator 22 as the excitation current. Then, when the rotation speed of the rotor of the induction generator 22 rotationally driven by the expander 16 becomes a synchronization speed or more, the induction generator 22 starts to generate power.

The setting value (that is, the rotation speed of the induction generator 22 when closing the switch 26) is set to suppress an influence on units provided in (connected to) the periphery of the electrical connection path 52 or the respective electronic components of the power generation apparatus 10 caused by the voltage drop of the electric power system 50 due to the starting current flowing from the electric power system 50 into the induction generator 22 when the switch 26 is closed. Specifically, this value is as below.

When the induction generator 22 (the rotor) is connected to the electric power system 50 in a stop state, that is, a state where a ratio of a slip as a difference between the synchronization speed and the rotation speed of the induction generator 22 is 100%, the induction generator becomes compulsively parallel to the electric power system 50 in a no-voltage state, so that a large starting current flows into the induction generator 22. Accordingly, the voltage drop of the electric power system 50 occurs.

As illustrated in FIG. 2, the starting current decreases (so as to become approximately the rated current) as the ratio of the slip decreases, that is, the difference between the synchronization speed and the rotation speed of the induction generator 22 decreases. Therefore, in the power generation apparatus 10 of the embodiment, the value of the starting current is specified which prevents the influence of the voltage drop on the respective electronic components of the power generation apparatus 10 or the units connected to the electric power system 50 or reduces the influence in an allowable range when the voltage drop occurs in the electric power system 50 due to the starting current flowing into the induction generator 22. Then, a range of a ratio of a slip in which the starting current is smaller than the specific value is obtained, and the rotation speed of the induction generator in which the slip is included in the range is used as the setting value.

The discharge rate control unit 342 adjusts the flow amount of the working medium ejected from the circulation pump 20 by outputting a rotation control signal so as to control the rotation speed of the circulation pump 20. Specifically, the discharge rate control unit 342 controls the rotation speed (the discharge rate) of the circulation pump 20 so that a predetermined flow amount of the working medium circulates in the circulation flow passage 12 during the general operation (power generation operation) of the power generation apparatus 10.

Further, the discharge rate control unit 342 controls the rotation speed of the circulation pump 20 so that the amount of the working medium ejected to the evaporator 14 gradually increases so as to match an increase in the rotation speed of the induction generator 22 until the switch 26 is closed after the expander 16 starts to rotate the induction generator 22 when starting (activating) the power generation apparatus 10, that is, the rotation speed reaches the setting value after the rotation speed detector 24 starts to detect the rotation of the induction generator 22.

In such a power generation apparatus 10, the power generation operation is started as below.

First, a heating medium is supplied from a heat source outside the apparatus to the evaporator 14 and a cooling medium is supplied from a cooling source outside the apparatus to the condenser 18 while the switch 26 is opened. In this state, the discharge rate control unit 342 operates the circulation pump 20 so as to circulate the working medium (step S1). Accordingly, the working medium that is gasified by the evaporator 14 is supplied to the expander 16, so that the expander 16 starts to rotationally drive the induction generator 22. Then, the discharge rate control unit 342 gradually increases the amount of the working medium supplied to the evaporator 14 by gradually increasing the rotation speed of the circulation pump 20 in response to an increase in the rotation speed of the expander 16 (the induction generator 22), that is, the flow amount of the working medium in the circulation flow passage 12 until the switch 26 is closed.

Since the flow amount of the working medium supplied to the expander 16 increases in accordance with an increase in the flow amount of the working medium in the circulation flow passage 12, the rotation speed of the induction generator 22 that is rotationally driven by the expander 16 also gradually increases. Then, when the rotation speed of the induction generator 22 increases to the setting value (in the example of the embodiment, 1000 rpm) and the switching control unit 341 detects the rotation speed by the rotation speed detector 24, the switch 26 is closed so that the electric power system 50 is connected to the induction generator 22 (step S2). Accordingly, the alternating current flowing in the electric power system 50 is supplied to the induction generator 22 as the excitation current. At this time, since the slip of the induction generator 22 with respect to the synchronization speed is small compared to the case where the induction generator 22 is connected to the electric power system 50 while the rotor of the induction generator 22 is stopped, the starting current caused by the slip is suppressed. Further, the voltage drop of the electric power system 50 is also suppressed.

Then, when the rotation speed of the induction generator 22 becomes faster than the synchronization speed, the induction generator 22 starts to generate power, so that power starts to be supplied from the power generation apparatus 10 (the induction generator 22) to the electric power system 50 (step S3).

Meanwhile, when the power generation apparatus 10 stops the power generation operation, the switch 26 is opened and the circulation pump 20 is stopped. Then, the supply of the heating medium from the heat source to the evaporator 14 and the supply of the cooling medium from the cooling source to the condenser 18 are stopped, so that the power generation operation performed by the power generation apparatus 10 is stopped.

While the structure and the operation of the power generation apparatus 10 according to the embodiment have been described, it is possible to suppress the starting current flowing from the electric power system 50 into the induction generator 22 by decreasing the difference between the rotation speed of the induction generator 22 and the synchronization speed at the time point in which the induction generator 22 is connected to the electric power system 50. Since a so-called direct input type is employed in which the electric power system 50 is connected to the induction generator 22 without using the inverter or the like, the manufacturing cost of the power generation apparatus 10 may be reduced.

Further, since the switch 26 is opened or closed based on the rotation speed of the generator, the switching control unit 341 may use the detection value of the rotation speed detector 24. As a result, there is no need to provide a separate gauge for opening or closing the switch 26, and hence the cost of the power generation apparatus 10 may be further reduced.

Further, in the power generation apparatus 10 of the embodiment, the circulation pump 20 is controlled so that the amount of the working medium supplied to the evaporator 14 gradually increases until the switch 26 is closed after the expander 16 starts to rotationally drive the induction generator 22 during the start-up operation. For this reason, the amount of the working medium ejected to the evaporator 14 is suppressed when starting the power generation apparatus 10, so that the over-rotation of the induction generator 22 caused by the abruptly supply of the working medium with respect to the expander 16 may be prevented.

Furthermore, the power generation apparatus and the power generation method of the present invention are not limited to the above-described embodiment, and of course, may be modified into various forms without departing from the spirit of the present invention.

The detailed index of the timing of closing the switch 26 is not limited. In the power generation apparatus 10 of the above-described embodiment, the switch 26 is closed by using the rotation speed of the induction generator 22 as an index, but the switch 26 may be controlled based on, for example, the slip. In this case, the setting value is set to be from 0% to 10% and more desirably from 2% to 5%. Further, the upstream pressure of the expander 16 in the circulation flow passage 12 may be used as an index or a pressure difference (or a pressure ratio) between the upstream pressure and the downstream pressure of the expander 16 may be used as an index. Further, a temperature difference (or a temperature ratio) between the temperature of the working medium flowing into the expander 16 and the temperature of the working medium discharged from the expander 16 may be used as an index. Further, the time elapsing from the start-up of the power generation apparatus 10 may be used as an index. That is, the power generation apparatus 10 may close the switch 26 after a predetermined time elapses from the time in which the working medium starts to circulate in the circulation flow passage 12. In any case, a condition in which the slip becomes the predetermined range is obtained in advance, and the switch 26 is closed when the condition is satisfied.

Figure 4:
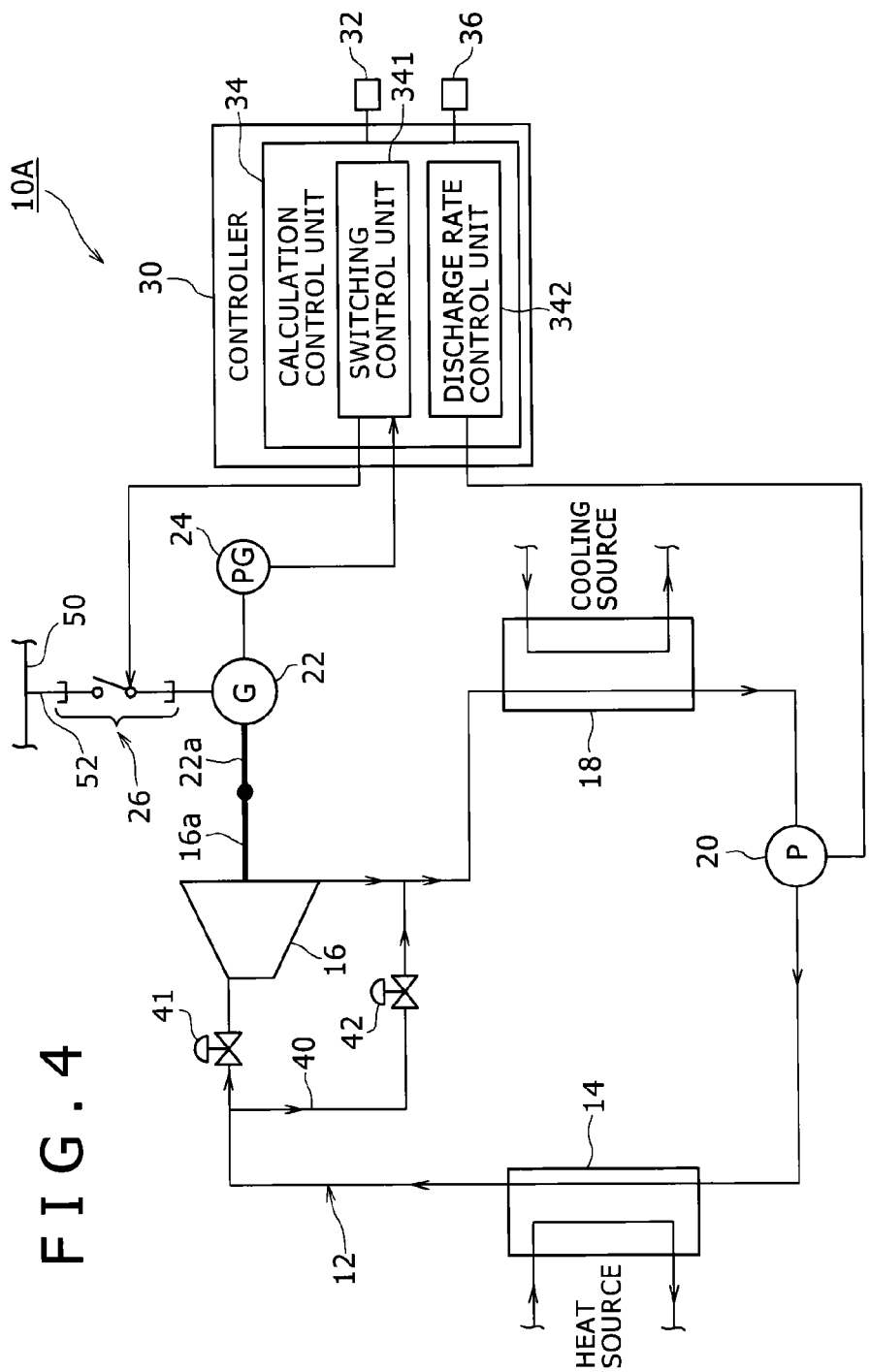
FIG. 4 is a schematic configuration diagram illustrating a power generation apparatus according to another embodiment.

The circulation flow passage 12 of the above-described embodiment is formed so that the working medium evaporated (gasified) in the evaporator 14 flows into the expander 16. However, for example, as illustrated in FIG. 4, the circulation flow passage 12 may be provided with a bypass flow passage that connects the upstream portion of the expander 16 to the downstream portion of the expander 16.

In this case, a first switching valve 41 is provided between the upstream end of the bypass flow passage 40 and the expander 16, and a second switching valve 42 is provided in the bypass flow passage 40. By providing such a bypass flow passage 40, the working medium may be circulated in the circulation flow passage 12 while not passing through the expander 16. Accordingly, when starting the power generation apparatus 10A, the first switching valve 41 is closed and the second switching valve 42 is opened so that the working medium is circulated without passing through the expander 16, thereby heating the lubricant included in the working medium.

Further, when stopping the power generation apparatus 10A, the working medium that remains inside the evaporator 14 and remains in a portion of the circulation flow passage 12 from the evaporator 14 to the expander 16 flows into the expander 16 even when the circulation pump 20 is stopped if the bypass flow passage 40 is not provided, and hence the expander 16 (the induction generator 22) may not be immediately stopped. However, in the power generation apparatus 10A (the power generation apparatus 10A in which the circulation flow passage 12 is provided with the bypass flow passage 40) illustrated in FIG. 4, the first switching valve 41 is closed and the second switching valve 42 is opened, so that the remaining working medium flows in the bypass flow passage 40. Accordingly, it is possible to prevent the working medium from flowing into the expander 16. For this reason, when the circulation pump 20 is stopped, the expander 16 (the induction generator 22) may be immediately stopped.

Figure 5:
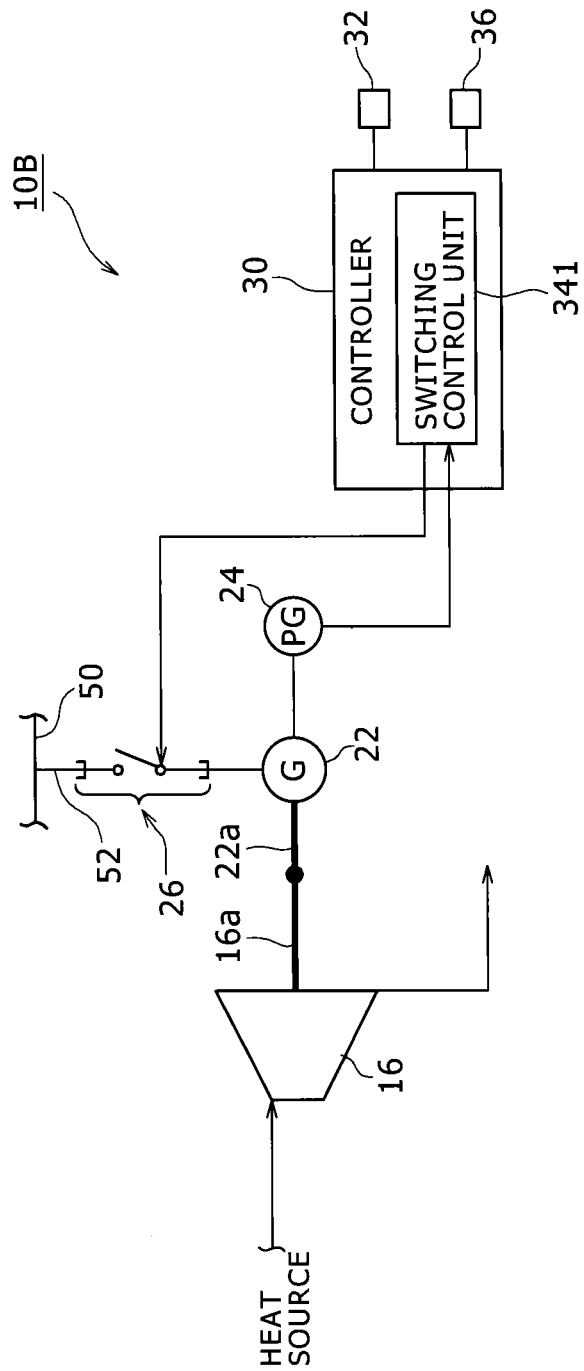
FIG. 5 is a schematic configuration diagram illustrating a power generation apparatus according to still another embodiment.

Further, the power generation apparatus 10 of the above-described embodiment is a so-called binary power generation apparatus, but is not limited to the configuration. For example, as illustrated in FIG. 5, a power generation apparatus 10B may have a configuration in which a working medium such as vapor supplied from a heat source directly flows into the expander 16. Even in such a configuration, the starting current flowing into the induction generator 22 may be suppressed in a manner such that the switching control unit 341 closes the switch 26 so as to connect the induction generator 22 to the electric power system 50 when the expander 16 rotationally drives the induction generator 22 so that the rotation speed of the induction generator 22 becomes larger than the setting value during the start-up operation of the power generation apparatus 10B.

What is claimed is:

1. A power generation apparatus comprising:
   an induction generator;
   a switch that opens or closes an electrical connection path connecting the induction generator to an electrical path in which an alternating current of a predetermined frequency flows;
   a control unit that controls the opening and closing state of the switch;
   an expander that rotationally drives the induction generator by a working medium supplied thereto;
   a pump provided to supply a controlled amount of the working medium to the expander; and
   wherein the control unit comprises means for closing the switch upon a lapse of a predetermined amount of time after the expander starts to rotationally drive the induction generator by the working medium supplied thereto, to start up the power generation apparatus, the predetermined amount of time being predetermined as an amount of time elapsed from the start-up of the power generation apparatus that is required for a difference between a rotation frequency of the induction generator and the predetermined frequency of the alternating current flowing from the electrical path into the induction generator to reach a predetermined range.

2. The power generation apparatus according to claim 1, further comprising:
   a circulation flow passage in which the working medium flows and the expander is disposed;
   an evaporator that is disposed at an upstream side of the expander in the circulation flow passage and evaporates the working medium by a heating medium supplied from outside of the power generation apparatus; and
   a condenser that is disposed at a downstream side of the expander in the circulation flow passage and condenses the working medium discharged from the expander by a cooling medium supplied from outside of the power generation apparatus,
   wherein the pump is disposed between the condenser and the evaporator in the circulation flow passage and supplies the working medium condensed by the condenser to the evaporator.

3. The power generation apparatus according to claim 2, wherein the control unit controls a pump speed so that an amount of the working medium supplied to the evaporator gradually increases to match an increase in a rotation speed of the induction generator until the switch is closed after the expander starts to rotationally drive the induction generator.

4. A power generation method that uses a power generation apparatus comprising an induction generator connected to an expander, the power generation method comprising:
   controlling a pump to supply a working medium to the expander, to rotationally drive the induction generator; and
   opening or closing, a via a switch, an electrical connection path that connects the induction generator to an electrical path in which an alternating current of a predetermined frequency flows when a predetermined amount of time has elapsed after the working medium is supplied to the expander so that the expander rotationally drives the induction generator, to start up the power generation apparatus, the predetermined amount of time being predetermined as an amount of time elapsed from the start-up of the power generation apparatus that is required for a difference between a rotation frequency of the induction generator and the predetermined frequency of the alternating current flowing from the electrical path into the induction generator to reach a predetermined range.

5. The power generation method according to claim 4, further comprising a step of controlling a pump speed so that an amount of the pumped working medium gradually increases to match an increase in a rotation speed of the induction generator until the switch is closed after the expander starts to rotationally drive the induction generator.

* * * * *